United States Patent [19]

Anscher

[11] 4,447,934

[45] May 15, 1984

[54] CABLE HARNESS

[75] Inventor: Bernard Anscher, Woodbury, N.Y.

[73] Assignee: National Molding Corporation, Farmingdale, N.Y.

[21] Appl. No.: 386,098

[22] Filed: Jun. 7, 1982

[51] Int. Cl.³ .......................................... B65D 63/10
[52] U.S. Cl. ................................. 24/16 PB; 248/74.3
[58] Field of Search ............ 24/16 PB, 17 AP, 17 A, 24/17 R, 30.5 P, 30.5 S; 248/74.5

[56] References Cited

U.S. PATENT DOCUMENTS

| | | | |
|---|---|---|---|
| 3,049,771 | 8/1962 | Litwin et al. | 24/16 PB |
| 3,339,247 | 9/1967 | Geisinger | 24/16 PB |
| 3,463,427 | 8/1969 | Fisher | 24/16 PB X |
| 3,942,750 | 3/1976 | Noorily | 24/16 PB X |
| 4,008,512 | 2/1977 | Prodel | 24/16 PB |

Primary Examiner—Robert P. Swiatek

Attorney, Agent, or Firm—Kenyon & Kenyon

[57] ABSTRACT

A cable harness adjustable to snugly secure axially aligned cables, wires, lines, cords, hoses, tubes and the like, having a wide range of bundle sizes, comprising a loop shaped flexible strap having a ratchet lock at one end thereof and a plurality of ratchet flaps spaced at intervals along its length, the ratchet lock having a channel therethrough orientated in the longitudinal direction of the flexible strap, and adapted to receive the free end of the flexible strap and to permit the passage of the strap therethrough, the channel also having a plurality of teeth orientated to engage the ratchet flaps on the flexible strap and to thereby prevent the backwards withdrawal of the strap from the channel while permitting its further insertion, the ratchet lock has a lateral opening feature which enables the cable harness once closed to be opened by removing the flexible strap laterally from the ratchet lock.

10 Claims, 7 Drawing Figures

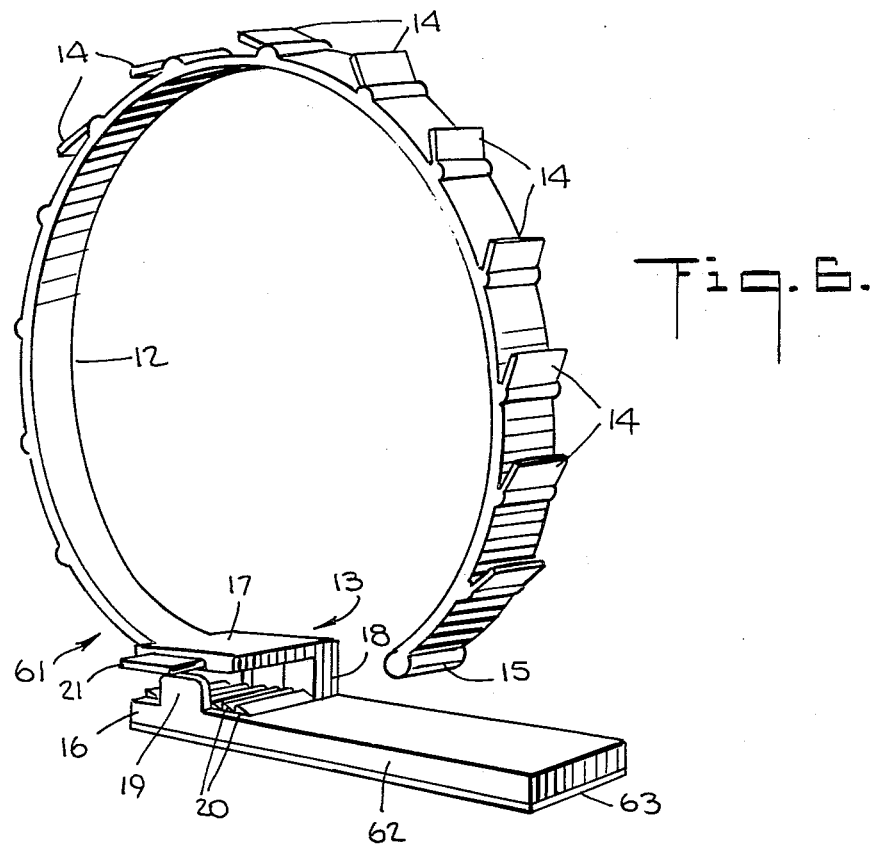
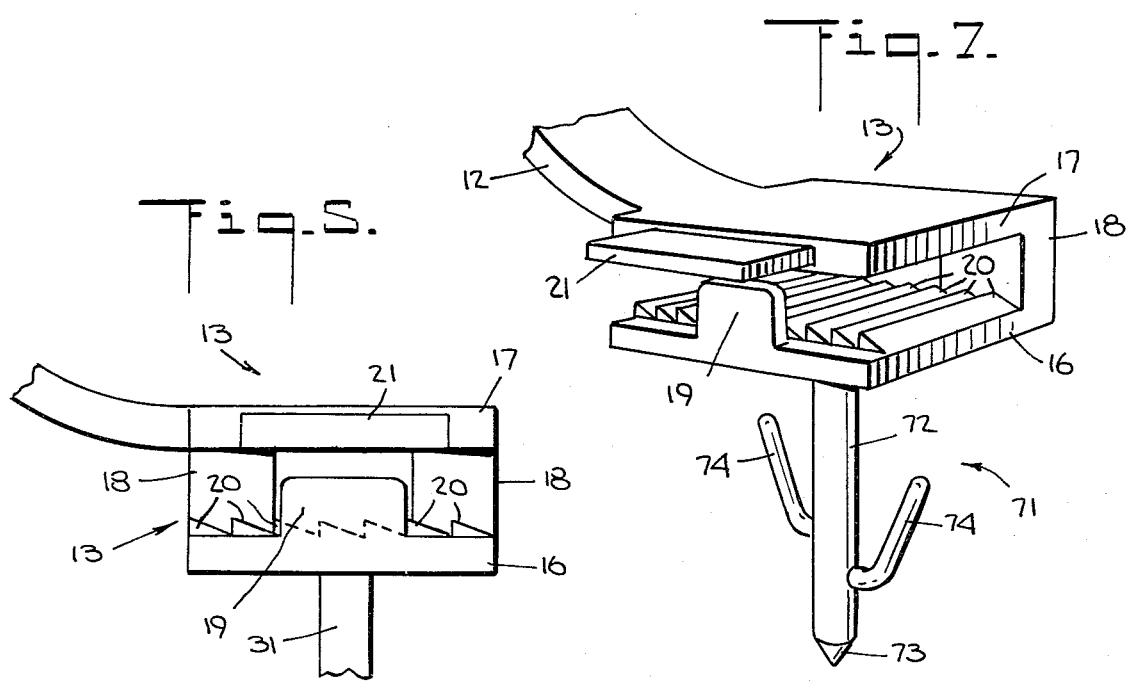

CABLE HARNESS

BACKGROUND TO INVENTION

This invention relates to convenient-to-use, yet sure, cable harnesses for securing axially aligned workpieces such as cables, wires, lines, cords, hoses, tubes and the like; more particularly the invention relates to cable harnesses which are adjustable to snugly hold workpiece bundles of different sizes and which can also be opened from the locked position by hand without damaging any workpieces contained therein.

Cable harnesses have generally fallen into one or two groups, those which merely secure a number of cables or other workpieces together in a bundle and those which secure one or more workpieces which also incorporate a device for affixing the cable harness to another object. The present invention is directed to an improved cable harness which can be employed either to secure workpieces together or in conjunction with an affixing device to hold the cable harness and its content to a fixed position.

Various different types of clamps and harnesses have heretofore been made and used for securing a wide variety of items together and/or to supports. For example, flexible strap type mounting devices have been used to attach hoses to panels in automobiles and to bind electrical cables together. Some such devices have had the advantage of being adjustable so that a single device might snugly hold workpiece bundles which vary in size, but have not been easily opened once put into service. Other such devices have been capable of being opened once in service but have not been adjustable so as to enable a single device to snugly hold more than one size workpiece bundle. In order for a cable harness to have maximum utility, it will be recognized that it must be adjustable to handle a wide range of bundle sizes, so as to minimize the stock of such parts which must be carried by installers, and also easily opened without damage to the cable harness or its contents, so as to enable the installer and ultimately the user to add to, take away from or change the contents of the harness.

It is quite common for cable harnesses to be employed in equipment of an electrical or mechanical nature which is congested with other parts and affords only limited accessibility to the site where a cable harness is to be installed or serviced once installed. As a consequence of the foregoing, the effectiveness of a cable harness will often depend on the ease with which the device can be installed, locked and reopened, if necessary.

It will also be recognized that while it is desirable for a cable harness to be adjustable over a broad range to hold workpiece bundles which vary greatly in size, it is also desirable for cable harnesses to be adjustable in very small increments so that they can tightly confine workpiece bundles regardless of their size. Among the applications in which the ability to make fine adjustments in the size of cable harnesses is considered to be most important are those in which such devices are used to restrain workpieces from motion and particularly from vibration.

Accordingly, it is an object of the present invention to provide an improved cable harness which can be locked easily and which when locked will securely hold any workpieces enclosed therein.

Another object of the present invention is to provide a cable harness which may be easily opened from the locked position.

A further object of the present invention is to provide an adjustable cable harness which can be used to snugly hold workpiece bundles of varying sizes.

A further object of the present invention is to make a cable harness which can be of an inexpensive, unitary, molded manufacture, utilizing widely available plastic materials such as nylon.

A still further object of the present invention is to make a cable harness which may be equipped with devices for affixing the cable harness and its contents to securing objects.

SUMMARY OF THE INVENTION

To accomplish the objects of this invention a cable harness is constructed from a strap of flexible material having a lock mechanism at one end and a series of lock flaps disposed at fixed intervals along the length of the strap. The strap has a generally circular shape which places the free end of the strap in a position juxtaposed from the lock mechanism, so that the free end of the strap can be driven into the lock mechanism merely by imposing a pinching action on the strap at positions roughly corresponding to points 90 and 270 degrees from the lock mechanism. The lock mechanism has a channel therethrough with a track of serrations which interact with the flaps on the flexible strap in a ratchet-like fashion whereby the free end of the strap may be inserted into and through the lock mechanism but cannot be withdrawn from the lock mechanism once the flaps on the strap have come into ratchet engagement with the serrations in the lock mechanism. In order to enable the opening of the cable harness of the present invention once it is locked, the lock mechanism of the invention is made having a side wall which can be opened to permit the strap to be removed laterally from the lock mechanism. When the cable harness of the invention is made of a flexible resilient material, which for example can be a plastic such as nylon, the openable side wall of the lock mechanism can take the form of a gap or slot between the roof and the side wall of the lock mechanism which can be widened to the extent necessary to slide the strap laterally from the lock mechanism by flexibly prying apart the members adjacent to the gap or slot.

Cables, wires, hoses, tubes or the like are inserted into the cable harness enclosure by passing them between the lock mechanism and the free end of the flexible strap. The cable harness is closed about its contents and any major adjustment in the length of the flexible strap, necessary to suitably enclose its contents, are made by pushing or pulling the strap through the lock mechanism so as to engage in the lock mechanism the flap which corresponds to a strap length which defines an enclosure of a roughly desired size. Thereafter the size of the harness enclosure can be "fine tuned" to snugly contain the enclosed workpieces by pushing or pulling the strap through the lock mechanism so as to move the flap engaged in the mechanism from one ratchet serration to the next.

Where it is considered desirable to fasten cables, wires, hoses, tubes or the like to a particular location, cable harnesses according to the present invention lend themselves to use with devices for affixing the harness and its contents to another object. Such affixing devices are well-known in the art, and any of them should be suitable for use with the present invention. Typical of these devices is one which can be attached to or integral with a part, consisting of a stem bearing resilient winglike projections, orientated on the stem so as to fold in against it while the stem is being inserted into a wall aperture and to expand behind the wall once fully inserted, thereby preventing removal. Other affixing devices range from simple clips to adhesives.

Other objects, features and advantages of the invention will be apparent from the following detailed description taken in connection with the accompanying drawings.

BRIEF DESCRIPTION OF THE DRAWINGS

The invention, as well as its objects and features will be better understood by reference to the following detailed description of the preferred embodiment of this invention taken in conjunction with the accompanying drawings in which:

FIG. 5 is a fragmentary sectional view taken substantially in the plane of line 5—5 in FIG. 3.

FIG. 6 is a perspective view of a cable harness according to the present invention, having an adhesive mount.

FIG. 7 is a fragmentary perspective section view of a cable harness according to the present invention, having a special mounting means for wallboard.

DETAILED DESCRIPTION OF THE INVENTION

Figure 1:
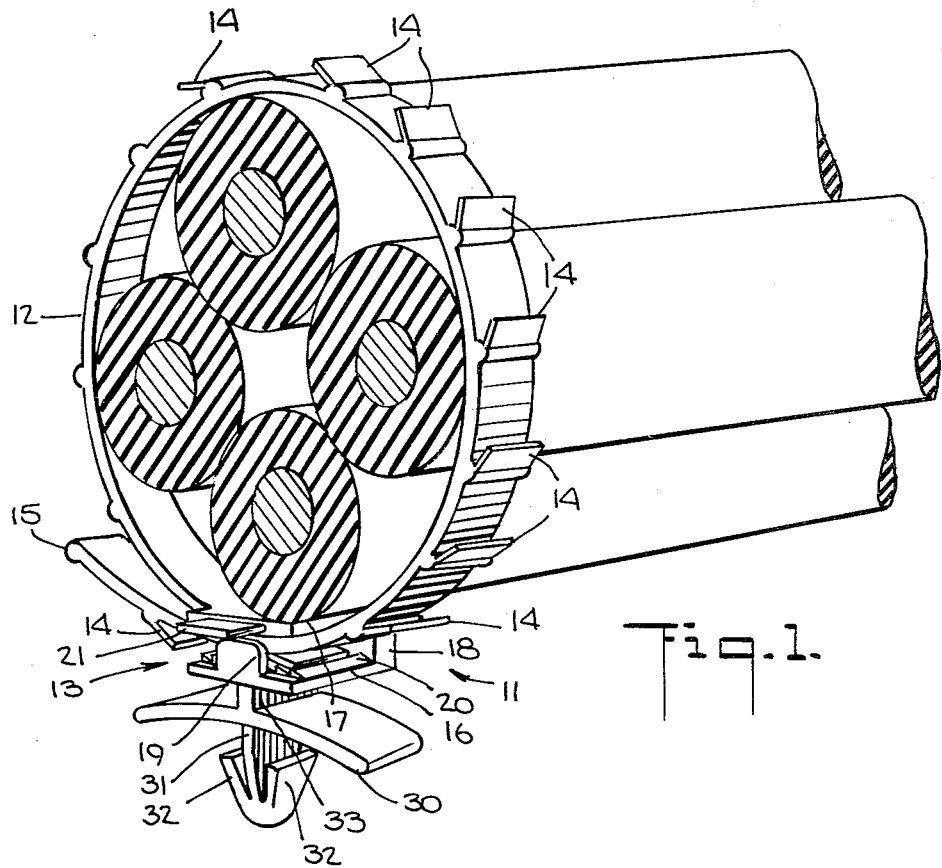
FIG. 1 is a perspective view of a cable harness according to the present invention, locked about a bundle of cables.
Figure 2:
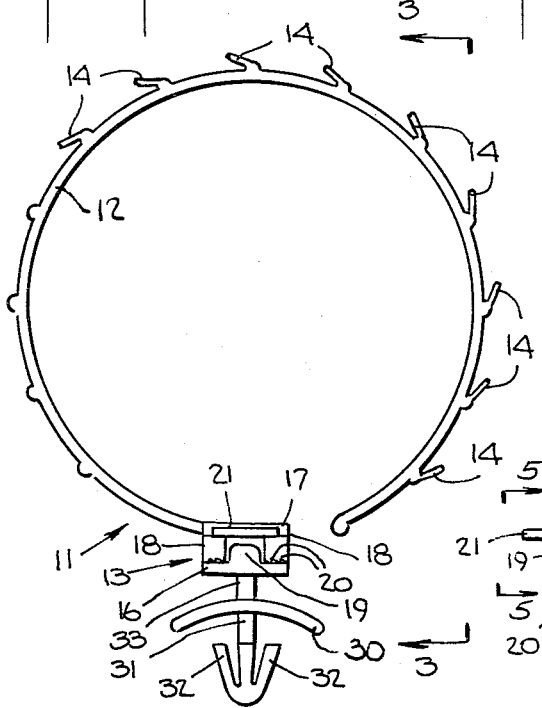
FIG. 2 is a side plan view of the cable harness of FIG. 1, in its unlocked state and without a cable bundle.
Figure 3:
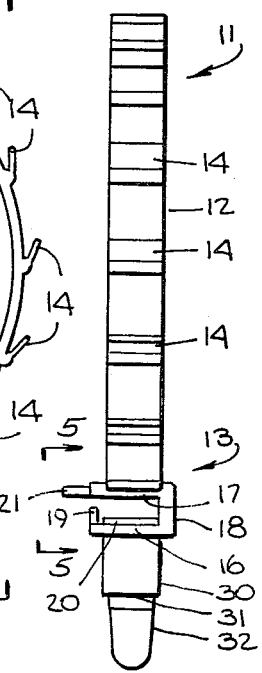
FIG. 3 is an end view of the cable harness of FIG. 2, taken on line 3—3 thereof.

Referring to the drawings wherein like parts are designated by the same number in all of the various figures, a cable harness 11 incorporating the features of the present invention and adapted for panel aperture mounting is shown in FIGS. 1–5 and cable harnesses 61 and 71 incorporating the features of the present invention in embodiments of the invention equipped with alternate mounting means are shown in FIGS. 6–7. All of the embodiments of the invention may be constructed of any flexible material such as, for example, nylon, acetal, polyester, polycarbonate, polyethylene, polypropylene, ABS, aluminum or steel. Preferably for most applications and from a point of view of cost, cable harnesses of the present invention are made as unitary pieces by injection molding from plastic dielectric insulating materials, which for example, may be any of the plastics previously recited; the construction and operation of injection molds being known to those skilled in the art of plastic manufacturing. Cable harnesses according to the present invention may also be formed by a number of other plastic molding techniques, such as, for example, casting and compression molding which are similarly familiar to persons skilled in the art. Where metal is choosen as the material of construction for a wire bundle clamp according to the invention, those skilled in that art will recognize die casting as a preferred method of fabrication. Regardless of the method of manufacture, it is viewed as greatly preferable to produce the various embodiments of the present invention as unitary pieces, however, the elements of this invention may also be separately manufactured and assembled into a complete device by adhesives or by mechanical means which will be obvious to those knowledgeable in the art of the material of fabrication.

Cable harness 11 includes a flexible strap 12, having at one end channel lock member 13 and a plurality of lock engaging flaps 14 disposed at intervals along flexible strap 12. In the preferred embodiments of the invention flexible strap 12 has a natural curvature which creates a strap enclosure having an annular opening for the insertion of workpieces between channel lock member 13 and strap lead end 15 at the end of flexible strap 12 distal from channel lock member 13. Workpieces intended to be confined by cable harness 11 are in the depicted preferred embodiments of the invention passed through the annular opening between channel lock member 13 and strap lead end 15 into the enclosure defined by flexible strap 12. Where necessary to accommodate the entry of a large workpiece into the strap enclosure, the annular opening between channel lock member 13 and strap lead end 15 may be easily enlarged by pushing said members apart. In other less preferred embodiments of the invention, flexible strap 12 may have little or no natural curvature and in operation it will be necessary to bend flexible strap 12 around any workpieces intended to be enclosed thereby. The length and curvature of flexible strap 12 are adapted to provide an enclosure of suitable size and configuration to contain the cables, wires, lines, cords, hoses, tubes or the like, intended for insertion therein. While the drawings depicting the invention display straps having generally circular configurations, it is conceived that the preferred embodiments of the present invention may utilize straps having the general shape of any closed geometric figure, including for example, oblongs and rectilinears.

Flexible strap 12 is integrally joined to channel lock member 13, which preferably has a generally rectangular configuration defined by a generally flat base 16, roof 17, wall members 18 and blocking tab 19. Wall members 18 join base 16 and roof 17 at their rear extremities and blocking tab 19 projects substantially perpendicularly from the front of base 16 and extends to a position of near contact with the interior face of roof 17. Flexible strap 12 is joined to channel lock member 13 at roof 17 at one of its open sides and extends along a generally circular path until it terminates at strap lead end 15 in a position juxtaposed from the opposite open end of channel lock member 13. Channel lock member 13 has a width, defined by the distance between the interior faces of rear wall members 18 and blocking tab 19, which is slightly greater than the width of flexible band 12.

Figure 4:
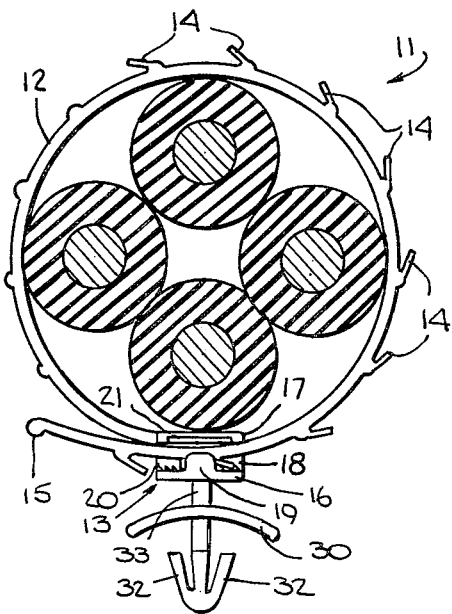
FIG. 4 is a side plan view of the locked cable harness of FIG. 1.

Locking engaging flaps 14 project from the radially outward surface of flexible strap 12 and are inclined from the surface thereof in the direction of the end of strap 12 which is joined to channel lock member 13 at an angle which is best less than 45 degrees and more preferably between 10 to 20 degrees. Protruding in an upward direction from base 16 are a plurality of inclined teeth 20 which are adapted to interlock in ratchet like fashion with lock engaging flaps 14. The distance between base 16 and roof 17 is adapted, along with the size of inclined teeth 20, to create in channel locking member 13 an interior channel having a height, measured from the peak of inclined teeth 20 to the interior face of roof 17, slightly less than lock engaging flaps 14 needed for free clearance through the channel. In the fashion described when lead strap end 15 is inserted into the open end of channel lock member 13 and flexible strap 12 is pushed through channel lock member 13, the passage of the first of lock engaging flaps 14 into channel lock member 13 is accompanied by steadily increasing resilient deformation of the flap 14, channel lock member 13 and flexible strap 12 as flap 14 slides along and up the surface of the first inclined tooth 20, until it reaches the peak of the inclined tooth 20 whereupon flap 14 is resiliently propelled into the valley between the first and second inclined teeth 20 with the ratchet-like click which is characteristic of such devices. It will be noted that where a flexible strap 12 having a generally circular configuration is employed, as in the embodiments of the invention depicted in the drawings, there will be an arcuate gap between the radially inward face of flexible strap 12 and the interior face of channel lock member roof 17 (FIG. 4). This arcuate gap above the arc of flexible strap 12 which is circumscribed by roof 17 enables flexible strap 12, by its spring like deformation into the arcuate gap, to contribute to the resilient forces serving to drive flaps 14 and inclined teeth 20 into ratchet locking engagement.

The closing of cable harness 11 around a workpiece or group of workpieces is, as aforementioned, commenced by the insertion of strap lead end 15 into the open end of channel lock member 13 from which it is juxtaposed. Strap lead end 15 is dimensioned so as to pass freely in either a forward or backward direction through channel lock member 13 and it is thus not until a sufficient length of flexible strap 12 has passed into and through channel lock member 13 as to bring the first lock engaging flap 14 into ratchet locking engagement with the first inclined tooth 20 of channel locking member 13, as aforedescribed, that backward movement is restrained, cable harness 11 becoming locked around its contents.

Major adjustments in the operative length flexible strap 12 and hence the size of the strap enclosure can be made by pushing or pulling flexible strap 12 through channel lock member 13 so as to engage successive lock engaging flaps 14 in channel lock member 13. Thus in operation, after workpieces are inserted into the strap enclosure, flexible strap 12 is feed into and through channel lock member 13 until a lock engaging flap 14 having a position on flexible strap 12 which corresponds with the strap length needed to define an enclosure of roughly the cross section of the enclosed workpieces enters into locking engagement with the inclined teeth 20 of channel lock member 13. Minor adjustments in the size of the strap enclosure can be made by pushing or pulling flexible strap 12 through channel lock member 13 so as to move a lock engaging flap 14 within the channel from one inclined tooth 20 to the next. This feature of the invention enables very minor "fine-tuning" adjustments in the size of the strap enclosure so that a bundle of workpieces may be held snugly regardless of its shape or size. In preferred embodiments of the invention, lock engaging flaps 14 are spaced along flexible strap 12 at intervals which correspond to the length of the track of inclined teeth 20 within channel lock member 13, so that in operation when flexible strap 12 is tightened about a workpiece bundle as a leading locking engaging flap 14 disengages from the last inclined tooth 20 in the channel lock member 13 the following lock engaging flap is already in engagement with inclined teeth 20 at the front end of the channel lock member 13 and preferably, in engagement with the first inclined tooth 20 in the channel lock member 13, thereby preventing any backslippage of flexible strap 12 in channel lock member 13.

The lock mechanism of the invention, if not for features of invention to be described hereinafter, could not be reopened without special tools or great force which would likely destroy the device. To enable the easy opening of the cable harness of the present invention, cable harness 11 is equipped with an easy opening feature depicted in the drawings, which feature enables cable harness 11 to be opened from the locked position by means of a manipulation which may be performed by hand without the aid of tools or any other device. As aforedescribed, one side wall of channel lock member 13 consists of blocking tab 19. Blocking tab 19 obstructs the movement of flexible strap 12 laterally from channel lock member 13. Blocking tab 19 extends to a position of near contact with roof 17 and the gap between roof 17 and blocking tab 19 is inadequate to permit the passage of flexible strap 12 through the said gap without significant deformation of channel lock member 13. Cable harness 11 may be released from the locked condition by prying roof 17 away from base 16 so as to enlarge the gap between blocking tab 19 and roof 17, whereupon, once a large enough gap is created to permit flexible strap 19 to pass therethrough, an axial force in the direction of the gap is applied to the flexible strap in the vicinity of the channel lock member 13 and the flexible strap is caused to slide laterally from the channel. After cable harness 11 is unlocked, as described, all of the parts thereof return to substantially their original position by reason of the resilient memory of their material construction, the device is thus ready for reuse. Channel lock member roof 17 may optionally be equipped with finger grip tab 21 which projects in an axial direction from roof 17 and serves as a convenient point of application for pivoting forces directed to opening the gap between roof 17 and blocking tab 19. In embodiments of the invention, not adapted for mounting to other objects, it is advantageous to provide gripping tabs on both base 16 and roof 17.

The number of lock engaging flaps 14 disposed on flexible strap 12 determines the extent of the adjustability of the cable harness 11. Where only a narrow range of bundle sizes is contemplated for the cable harness according to the invention, lock engaging flaps 14 may be few in number and extended over only a fraction of the length of flexible strap 12. Where the broadest possible adjustability is desired, lock engaging flaps 14 are best disposed over the greater part of the length of flexible strap 12, there being no need to equip flexible strap 12 with lock engaging flaps 14 on portions of strap 12 which, by reason of proximity to the end of strap 12 which is affixed to channel lock member 13, cannot be reasonably drawn into locking alignment within channel lock member 13.

As has been indicated, injection molding is the preferred method of fabrication for the present invention. Those familiar with that art will appreciate that certain features of the described embodiments of the present invention are specially adapted to facilitate manufacture by that method, including for example the construction of the rear wall of channel lock member 13 as divided wall members 18 and the limited cross section of blocking tab 19. Such refinements should not be taken in any way to limit the generality of the present invention.

Cable harness 11 includes a device for affixing the clamp to supporting wall panels having apertures therein. It comprises a wall panel support 30 integral with substantially perpendicular aperture stem 31 which bears extended flexible resilient wings 32 inclined in the direction of wall panel support 30. In operation, as aperture stem 31 is inserted into a wall aperture of appropriate size, wings 32 fold in against aperture stem 31. Once aperture stem 31 is fully inserted, wings 32 resiliently return to their extended positions engaging the reverse side of the wall and preventing removal of the affixing device. Harness stem 33 is appended on one end to channel lock member base 16 and on its other end to wall panel support 30. The length of harness stem 33 as well as its flexibility and shape are adapted to conform to the requirements of the intended use of cable harness 11.

Cable harness 61 and 71 are of the same design as cable harness 11, excepting that instead of the aperture type mount included on cable harness 11, cable harness 61 is equipped with an adhesive type mount and cable harness 71 with a wallboard type fastner. Cable harness 61 has platform 62 extending from channel lock member 13, which may, as in the embodiment depicted in FIG. 6, be an extension of base 16. Platform 62 has an adhesive 63 on its radially outward side which can be employed to affix platform 62 and thus cable harness 61 to any substantially smooth surface having the same cross section as platform 62. Cable harness 71, as shown in FIG. 7, is equipped with a mounting device for wallboard including an elongate shank 72 projecting in a substantially perpendicular direction from the exterior face of base 16, having a pointed distal end 73 and two wallboard gripping arms 74 which extend from shank 72 first in a substantially perpendicular direction and turn after a short run to an incline relative to shank 72 in the direction of base 16. Gripping arms 74 extend from diametrically opposite portions of shank 72 and though both are proximate to the pointed distal end 73 they are displaced slightly from each other along the axis of shank 72. Other types of mounting devices are also easily adapted for use with the present invention.

While the present invention has been particularly described in terms of specific embodiments thereof, it will be understood in view of the present disclosure, that numerous variations upon the invention are now enabled to those skilled in the art, which variations yet reside within the scope of the present invention. Accordingly, the invention is to be broadly construed, and limited only by the scope and spirit of the claims now appended hereto.

I claim:

1. A cable harness comprising: a flexible strap having a ratchet lock and a plurality of ratchet engaging members disposed thereon so as to define therebetween operative strap lengths corresponding to different workpiece bundle sizes, said ratchet lock having a channel orientated in the longitudinal direction of said flexible strap and sized to permit the passage of said flexible strap therethrough in said longitudinal direction only, said channel having a plurality of ratchet teeth disposed therein to engage said ratchet engaging members on said flexible strap when in operation, said flexible strap is moved through said channel to tighten said cable harness about a bundle and to restrain, by virtue of that engagement, the movement of said flexible strap in a cable harness loosening direction while permitting movement in the tightening direction, thereby locking said cable harness, and a ratchet lock lateral opening means serving to open a side of said ratchet lock channel so as to enable a flexible strap of a locked cable harness to be removed from the ratchet lock of said cable harness laterally with respect to the path travelled by said flexible strap through said ratchet lock, said opening means comprising a side wall or tab extending at least partially across said ratchet lock channel side.

2. The cable harness of claim 1, wherein said flexible strap has a loop shape and said ratchet lock is joined to said flexible strap at an end thereof, said joining being on the surface of said ratchet lock which is radially innermost with respect to the enclosure defined by the loop shape of said flexible strap, whereby when in operation said flexible strap is moved through said ratchet lock channel to tighten said harness about a bundle, any portions of said flexible strap passing entirely through said channel do so externally to the strap enclosure.

3. The cable harness of claim 2, further including a means for attaching said cable harness to another object, whereby said cable harness may be used to retain a bundle in a fixed location.

4. A cable harness comprising: a loop shaped flexible strap having a ratchet lock on one end thereof and a plurality of ratchet flaps spaced along the surface of said flexible strap which is radially outward with respect to the enclosure defined by said flexible strap so as to define between said ratchet lock and said ratchet flaps a plurality of operative strap lengths corresponding to different enclosure sizes, said ratchet lock having a channel therethrough orientated in the longitudinal direction of said flexible strap, said channel being sized to permit said flexible strap to pass therethrough and having a plurality of ratchet teeth disposed on the interior surface thereof which is radially distal with respect to the flexible strap enclosure orientated for interlocking ratchet engagement with said ratchet flaps, said channel having a radial dimension which is slightly less than the ratchet flaps on said flexible strap required for free clearance through said channel thereby urging said ratchet flaps into ratchet locking engagement with said ratchet teeth when said flexible strap is moved through said channel, said ratchet lock having a lateral surface divided by a slot extending the length of the channel in said ratchet lock and dividing said lateral surface into a radially inner lateral surface and a radially outer lateral surface which surfaces are radially moveable with respect to each other, said slot having a normal width over at least part of its length which is insufficient to permit the passage of said flexible strap laterally from said channel.

5. The cable harness of claim 4, wherein the distance between the first ratchet tooth and the last ratchet tooth engaged by a ratchet flap passing through said channel is not less than the distance between each of the ratchet flaps on said flexible strap, whereby when in operation said flexible strap is moved through said ratchet lock channel to tighten said cable harness about a bundle, as a leading ratchet flap disengages from the last ratchet tooth in said channel the following ratchet flap will already be in engagement with the ratchet teeth in said channel, thereby preventing any cable harness loosening backwards movement of said flexible strap.

6. The cable harness of claim 5, wherein said flexible strap has a substantially annular shape and is joined to said ratchet lock at the surface thereof, which is radially innermost with respect to the enclosure defined by said flexible strap, whereby when in operation said flexible strap is moved through said ratchet lock channel to tighten said cable harness about a bundle any portions of said flexible strap passing entirely through said channel do so externally to the strap enclosure.

7. The cable harness of claim 6, further including at least one grippable projection extending from the radially inner and/or outer lateral surfaces of said ratchet lock for use in effecting the radial movement of said inner and outer lateral surfaces with respect to each other, whereby the slot therebetween can be widened to enable the passage of the flexible strap laterally from said ratchet lock to unlock the cable harness.

8. The cable harness of claim 6, further including a means for attaching said cable harness to another object, whereby said cable harness may be used to retain a bundle in a fixed location.

9. The cable harness of claim 8, wherein the means for attaching said cable harness to another object is affixed to said cable harness on the radially outermost surface of the ratchet lock and further including a grippable projection extending from the radially inner lateral surface of said ratchet lock for use in effecting the radial movement of the inner and outer lateral surfaces with respect to each other, whereby said slot between said inner and outer surfaces can be widened to enable the passage of the flexible strap laterally from the channel when the cable harness is unlocked.

10. A method of releasing a workpiece bundle from a cable harness confining said workpiece bundle in a loop-shaped enclosure, said cable harness comprising a flexible strap having a plurality of ratchet engaging members and a ratchet lock disposed thereon, said cable harness being locked against movement of said flexible strap in an enclosure enlarging direction by the engagement of at least one ratchet engaging member with at least one of a plurality of ratchet teeth disposed in a channel running through said ratchet lock in the longitudinal direction of said flexible strap, said channel being sized to permit the passage of said flexible strap therethrough in the longitudinal direction only, comprising:

opening a side of said ratchet lock by creating or widening a gap therein with a ratchet lock lateral opening means provided on said ratchet lock and adapted to enable the channel of said ratchet lock to be opened by hand along said side thereof so that said ratchet lock is deformed sufficiently to enable said flexible strap to be removed therefrom in a lateral direction with respect to the path traveled by said flexible strap through said ratchet lock, and then removing said flexible strap from said channel through the opened side of said ratchet lock, thereby opening the loop-shaped enclosure of said cable harness and releasing the workpiece bundle therefrom.

* * * * *